United States Patent
Nakata et al.

(10) Patent No.: US 10,516,671 B2
(45) Date of Patent: Dec. 24, 2019

(54) BLACK LIST GENERATING DEVICE, BLACK LIST GENERATING SYSTEM, METHOD OF GENERATING BLACK LIST, AND PROGRAM OF GENERATING BLACK LIST

(71) Applicant: NIPPON TELEGRAPH AND TELEPHONE CORPORATION, Chiyoda-ku (JP)

(72) Inventors: Kensuke Nakata, Musashino (JP); Tohru Sato, Musashino (JP); Kazufumi Aoki, Musashino (JP); Kazunori Kamiya, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 107 days.

(21) Appl. No.: 15/550,890

(22) PCT Filed: Feb. 10, 2016

(86) PCT No.: PCT/JP2016/053982
§ 371 (c)(1),
(2) Date: Aug. 14, 2017

(87) PCT Pub. No.: WO2016/132992
PCT Pub. Date: Aug. 25, 2016

(65) Prior Publication Data
US 2018/0063146 A1    Mar. 1, 2018

(30) Foreign Application Priority Data

Feb. 20, 2015 (JP) ................................ 2015-031585

(51) Int. Cl.
G06F 7/04 (2006.01)
G06F 15/16 (2006.01)
(Continued)

(52) U.S. Cl.
CPC ........ H04L 63/101 (2013.01); H04L 63/1433 (2013.01); H04L 63/1441 (2013.01)

(58) Field of Classification Search
CPC ............... H04L 63/101; H04L 63/1433; H04L 63/1441
(Continued)

(56) References Cited

U.S. PATENT DOCUMENTS 8,151,341 B1    4/2012  Gudov et al.
2007/0226803 A1  9/2007  Kim et al.
(Continued)

FOREIGN PATENT DOCUMENTS

| CN | 104246786 A | 12/2014 |
| JP | 2012-118713 A | 6/2012 |
| JP | 2014-99758 A | 5/2014 |

OTHER PUBLICATIONS

Extended European Search Report dated Feb. 15, 2018 in corresponding European Patent Application No. 16752378.6 citing documents AA, AB, AC, AD, AE and AO therein, 7 pages.
(Continued)

Primary Examiner — Jeffrey C Pwu
Assistant Examiner — Samuel Ambaye
(74) Attorney, Agent, or Firm — Oblon, McClelland, Maier & Neustadt, L.L.P.

(57) ABSTRACT

A blacklist generating device acquires a malicious communication log and a normal communication log. A malicious communication profile extracting function calculates statistics on communication patterns included in the malicious communication log and outputs a communication pattern satisfying a certain condition to a potential blacklist. A normal communication profile extracting function calculates statistics on communication patterns included in the normal communication log and outputs a communication pattern satisfying a certain condition to a whitelist. A blacklist
(Continued)

| ITEM NUMBER | LIST NAME | CONTENT OF LIST | EXAMPLE VALUE |
|---|---|---|---|
| 1 | DESTINATION IP BLACKLIST | DESTINATION IP ADDRESS FREQUENTLY APPEARING ON MALWARE COMMUNICATION | 192.168.10.30<br>192.168.20.40 |
| 2 | UserAgent BLACKLIST | UserAgent NAME FREQUENTLY APPEARING ON MALWARE COMMUNICATION | Rescue/9.11<br>ExUserAgent/5.0/20061010 Example/2.0 |
| 3 | URL BLACKLIST | URL FREQUENTLY APPEARING ON MALWARE COMMUNICATION | http://93.115.82.86/<br>http://simple-cdn-node.com/gate.php |
| 4 | QUERY KEY STRING BLACKLIST | COMBINATION OF QUERY KEYS INCLUDED IN URL FREQUENTLY APPEARING ON MALWARE COMMUNICATION | app,mc,nm,sc,uuid<br>adv,b,c,code1,code2,id,p |
| 5 | URL PASS BLACKLIST | PASS PART INCLUDED IN URL FREQUENTLY APPEARING ON MALWARE COMMUNICATION | /MSS1.rar<br>/disclosures/offers/disclosure.iq.driverfighter_r1_v2.zip |
| 6 | TCP DESTINATION PORT BLACKLIST | TCP DESTINATION PORT NUMBER FREQUENTLY APPEARING ON MALWARE COMMUNICATION | 8080<br>1111 |
| 7 | UDP DESTINATION PORT BLACKLIST | UDP DESTINATION PORT NUMBER FREQUENTLY APPEARING ON MALWARE COMMUNICATION | 23456<br>54633 | creating function searches the potential blacklist for a value with the value on the whitelist, excludes a coincident communication pattern from the potential blacklist, and creates a blacklist.

7 Claims, 12 Drawing Sheets

(51) Int. Cl.
    *G06F 17/30*      (2006.01)
    *H04L 29/06*      (2006.01)

(58) Field of Classification Search
    USPC .............................................................. 726/4
    See application file for complete search history.

(56) References Cited

U.S. PATENT DOCUMENTS

| | | | |
|---|---|---|---|
| 2009/0064332 A1* | 3/2009 | Porras | H04L 63/101 726/23 |
| 2012/0090027 A1 | 4/2012 | Sohn et al. | |
| 2013/0318604 A1 | 11/2013 | Coates et al. | |
| 2014/0047543 A1* | 2/2014 | Kim | H04L 63/1441 726/23 |
| 2015/0040225 A1 | 2/2015 | Coates et al. | |
| 2016/0182546 A1 | 6/2016 | Coates et al. | |
| 2017/0142149 A1 | 5/2017 | Coates et al. | |

OTHER PUBLICATIONS

International Search Report dated May 10, 2016, in PCT/JP2016/053982 filed Feb. 10, 2016.

Kensuke Nakata et al., "Ruleset Optimization for Detecting Malware-Derived Traffic Based on Network-Dependent Log Analysis", The Institute of Electronics, Information and Communication Engineers, vol. 74, Mar. 2014, total pages 6 (with English abstract).

Office Action dated Aug. 15, 2019 in Chinese Application No. 201680010175.8 (w/English machine translation).

* cited by examiner

FIG.2

| ITEM NUMBER | ITEM NAME | REMARKS |
|---|---|---|
| 1 | TIMESTAMP | TIME WHEN LOG IS ACQUIRED |
| 2 | LogSource | UNIQUE ID FOR EACH DEVICE RECORDING LOG |
| 3 | SENDER IP ADDRESS | INFORMATION OF SENDER IP ADDRESS OF THE COMMUNICATION |
| 4 | SENDER PORT NUMBER | SENDER PORT NUMBER OF THE COMMUNICATION |
| 5 | DESTINATION IP ADDRESS | DESTINATION IP ADDRESS OF THE COMMUNICATION |
| 6 | DESTINATION PORT NUMBER | DESTINATION PORT NUMBER OF THE COMMUNICATION |
| 7 | COMMUNICATION PROTOCOL NAME | COMMUNICATION PROTOCOL NAME OF THE COMMUNICATION |
| 8 | RESULT OF DETERMINATION | RESULT OF DETERMINATION IN DEVICE OF THE COMMUNICATION |
| 9 | NUMBER OF BYTES TO SEND | NUMBER OF BYTES TO SEND OF THE COMMUNICATION |
| 10 | NUMBER OF BYTES TO RECEIVE | NUMBER OF BYTES TO RECEIVE OF THE COMMUNICATION |
| 11 | URL | DESTINATION URL IN THE CASE THAT THE COMMUNICATION IS HTTP COMMUNICATION |
| 12 | METHOD NAME | HTTP METHOD NAME IN THE CASE THAT THE COMMUNICATION IS HTTP COMMUNICATION |
| 13 | UserAgent | HTTP USER AGENT NAME IN THE CASE THAT THE COMMUNICATION IS HTTP COMMUNICATION |
| 14 | STATUS CODE | HTTP STATUS CODE IN THE CASE THAT THE COMMUNICATION IS HTTP COMMUNICATION |
| 15 | RETENTION TIME | SESSION RETENTION TIME IN THE COMMUNICATION |
| 16 | COMMUNICATION DIRECTION | COMMUNICATION DIRECTION IN THE COMMUNICATION |

FIG.3

| COMMU-NICATION LOG FIELD | VALUE | MALWARE COMMUNICATION | | |
|---|---|---|---|---|
| | | NUMBER OF OCCUR-RENCES | NUMBER OF MALWARE PIECES | OCCUR-RENCE RATE |
| DESTINA-TION IP ADDRESS | 192.168.10.30 | 160 | 80 | 0.8 |
| | 192.168.20.40 | 100 | 50 | 0.5 |
| | 10.0.0.3 | 20 | 20 | 0.2 |
| UserAgent | Rescue/9.11 | 160 | 80 | 0.8 |
| | HTTPTEST | 20 | 20 | 0.2 |
| | ExUserAgent/5.0/20061010 Example/2.0 | 10 | 10 | 0.1 |
| URL | http://93.115.82.86/ | 160 | 80 | 0.8 |
| | http://enterprise-malware.com/ | 160 | 80 | 0.8 |
| | http://simple-cdn-node.com/gate.php | 20 | 20 | 0.2 |
| QUERY KEY | adv,b,c,code1,code2,id,p | 100 | 50 | 0.5 |
| | app,mc,nm,sc,uuid | 100 | 1 | 0.01 |
| URL PASS | /newbos2.exe | 160 | 80 | 0.8 |
| | /MSS1.rar | 20 | 20 | 0.2 |
| | /disclosures/offers/disclosure.iq.driverfighter_r1_v2.zip | 10 | 10 | 0.1 |
| DESTINA-TION PORT (TCP) | 1111 | 100 | 50 | 0.5 |
| | 8080 | 100 | 1 | 0.01 |
| DESTINA-TION PORT (UDP) | 23456 | 140 | 70 | 0.7 |
| | 54633 | 100 | 50 | 0.5 |

FIG.4

| ITEM NUMBER | LIST NAME | CONTENT OF LIST | EXAMPLE VALUE |
|---|---|---|---|
| 1 | DESTINATION IP POTENTIAL BLACKLIST | DESTINATION IP ADDRESS FREQUENTLY APPEARING ON MALWARE COMMUNICATION | 192.168.10.30<br>192.168.20.40<br>10.0.0.3 |
| 2 | UserAgent POTENTIAL BLACKLIST | UserAgent NAME FREQUENTLY APPEARING ON MALWARE COMMUNICATION | Rescue/9.11<br>HTTPTEST<br>ExUserAgent/5.0/20061010 Example/2.0 |
| 3 | URL POTENTIAL BLACKLIST | URL FREQUENTLY APPEARING ON MALWARE COMMUNICATION | http://93.115.82.86/<br>http://enterprise-malware.com/<br>http://simple-cdn-node.com/gate.php |
| 4 | QUERY KEY STRING POTENTIAL BLACKLIST | COMBINATION OF QUERY KEYS INCLUDED IN URL FREQUENTLY APPEARING ON MALWARE COMMUNICATION | app,mc,nm,sc,uuid<br>adv,b,c,code1,code2,id,p |
| 5 | URL PASS POTENTIAL BLACKLIST | PASS PART INCLUDED IN URL FREQUENTLY APPEARING ON MALWARE COMMUNICATION | /newbos2.exe<br>/MSS1.rar<br>/disclosures/offers/disclosure.iq.driverfighter_r1_v2.zip |
| 6 | TCP DESTINATION PORT POTENTIAL BLACKLIST | TCP DESTINATION PORT NUMBER FREQUENTLY APPEARING ON MALWARE COMMUNICATION | 8080<br>1111 |
| 7 | UDP DESTINATION PORT POTENTIAL BLACKLIST | UDP DESTINATION PORT NUMBER FREQUENTLY APPEARING ON MALWARE COMMUNICATION | 23456<br>54633 |

FIG.5

| COMMU-NICATION LOG FIELD | VALUE | PROTECTED NETWORK | | |
|---|---|---|---|---|
| | | NUMBER OF OCCUR-RENCES | NUMBER OF TER-MINALS | OCCUR-RENCE RATE |
| DESTINA-TION IP ADDRESS | 10.0.0.3 | 200 | 40 | 0.4 |
| | 192.168.10.30 | 160 | 1 | 0.01 |
| | 192.168.20.40 | 10 | 10 | 0.1 |
| UserAgent | Rescue/9.11 | 160 | 1 | 0.01 |
| | HTTPTEST | 10 | 50 | 0.5 |
| | ExUserAgent/5.0/20061010 Example/2.0 | 10 | 10 | 0.1 |
| URL | http://enterprise-malware.com/ | 160 | 80 | 0.8 |
| | http://93.115.82.86/ | 20 | 10 | 0.1 |
| QUERY KEY | adv,b,c,code1,code2,id,p | 100 | 50 | 0.5 |
| | app,mc,nm,sc,uuid | 100 | 1 | 0.01 |
| URL PASS | /newbos2.exe | 160 | 80 | 0.8 |
| | /disclosures/offers/disclosure.iq.driverfighter_r1_v2.zip | 10 | 10 | 0.1 |
| DESTINA-TION PORT (TCP) | 8080 | 100 | 1 | 0.01 |
| | 1111 | 30 | 10 | 0.1 |
| DESTINA-TION PORT (UDP) | 23456 | 100 | 1 | 0.01 |
| | 54633 | 20 | 15 | 0.15 |

FIG.6

| ITEM NUMBER | LIST NAME | CONTENT OF LIST | EXAMPLE VALUE |
|---|---|---|---|
| 1 | DESTINATION IP WHITELIST | DESTINATION IP ADDRESS FREQUENTLY APPEARING ON COMMUNICATION IN PROTECTED NETWORK | 10.0.0.3 |
| 2 | UserAgent WHITELIST | UserAgent NAME FREQUENTLY APPEARING ON COMMUNICATION IN PROTECTED NETWORK | HTTPTEST |
| 3 | URL WHITELIST | URL FREQUENTLY APPEARING ON COMMUNICATION IN PROTECTED NETWORK | http://enterprise-malware.com/ |
| 4 | URL PASS WHITELIST | PASS PART FREQUENTLY APPEARING ON COMMUNICATION IN PROTECTED NETWORK | /newbos2.exe |

FIG.7

| ITEM NUMBER | LIST NAME | CONTENT OF LIST | EXAMPLE VALUE |
|---|---|---|---|
| 1 | DESTINATION IP BLACKLIST | DESTINATION IP ADDRESS FREQUENTLY APPEARING ON MALWARE COMMUNICATION | 192.168.10.30<br>192.168.20.40 |
| 2 | UserAgent BLACKLIST | UserAgent NAME FREQUENTLY APPEARING ON MALWARE COMMUNICATION | Rescue/9.11<br>ExUserAgent/5.0/20061010 Example/2.0 |
| 3 | URL BLACKLIST | URL FREQUENTLY APPEARING ON MALWARE COMMUNICATION | http://93.115.82.86/<br>http://simple-cdn-node.com/gate.php |
| 4 | QUERY KEY STRING BLACKLIST | COMBINATION OF QUERY KEYS INCLUDED IN URL FREQUENTLY APPEARING ON MALWARE COMMUNICATION | app,mc,nm,sc,uuid<br>adv,b,c,code1,code2,id,p |
| 5 | URL PASS BLACKLIST | PASS PART INCLUDED IN URL FREQUENTLY APPEARING ON MALWARE COMMUNICATION | /MSS1.rar<br>/disclosures/offers/disclosure.iq.driverfighter_r1_v2.zip |
| 6 | TCP DESTINATION PORT BLACKLIST | TCP DESTINATION PORT NUMBER FREQUENTLY APPEARING ON MALWARE COMMUNICATION | 8080<br>1111 |
| 7 | UDP DESTINATION PORT BLACKLIST | UDP DESTINATION PORT NUMBER FREQUENTLY APPEARING ON MALWARE COMMUNICATION | 23456<br>54633 |

FIG.8

| ITEM NUMBER | LIST NAME | CONTENT OF LIST | EXAMPLE VALUE |
|---|---|---|---|
| 1 | URL PASS PATTERN BLACKLIST | BLACKLIST HAVING PASS PART INCLUDED IN URL FREQUENTLY APPEARING ON MALWARE COMMUNICATION WRITTEN IN REGULAR EXPRESSION AND COMPOSED OF PATTERN KEY AND PATTERN | /2/6/15 /up/[0-9]{4}\-[0-9]{1}/[0-9]{11}\.JPG$<br>/2/19 /os/OfferScreen\_[0-9]{3}\.zip$ |
| 2 | UserAgent PATTERN BLACKLIST | BLACKLIST WITH UserAgent INFORMATION FREQUENTLY APPEARING ON MALWARE COMMUNICATION WRITTEN IN REGULAR EXPRESSION | Rescue/[0-9]{2}\.[0-9]{1}$<br>ExUserAgent/[0-9].[0-9]/[0-9]{8} Example/[0-9].[0-9] |

FIG.9

| COMMU-NICATION LOG FIELD | | VALUE | MALWARE COMMUNICATION ||| PROTECTED NETWORK |||
|---|---|---|---|---|---|---|---|---|
| | | | NUMBER OF OCCUR-RENCES | NUMBER OF MALWARE PIECES | OCCUR-RENCE RATE | NUMBER OF OCCUR-RENCES | NUMBER OF TERMINALS | OCCUR-RENCE RATE |
| DESTINA-TION IP ADDRESS | | 192.168.10.30 | 160 | 80 | 0.8 | 160 | 1 | 0.01 |
| | | 192.168.20.40 | 100 | 50 | 0.5 | 10 | 10 | 0.1 |
| | | 10.0.0.3 | 20 | 20 | 0.2 | 200 | 40 | 0.4 |
| UserAgent | | Rescue/9.11 | 160 | 80 | 0.8 | 160 | 1 | 0.01 |
| | | ExUserAgent/5.0/20061010 Example/2.0 | 10 | 10 | 0.1 | 10 | 10 | 0.1 |
| | | HTTPTEST | 20 | 20 | 0.2 | 10 | 50 | 0.5 |
| URL | | http://93.115.82.86/ | 160 | 80 | 0.8 | 20 | 10 | 0.1 |
| | | http://simple-cdn-node.com/gate.php | 20 | 20 | 0.2 | 0 | 0 | 0 |
| | | http://enterprise-malware.com/ | 160 | 80 | 0.8 | 160 | 80 | 0.8 |
| QUERY KEY | | app,mc,nm,sc,uuid | 100 | 1 | 0.01 | 100 | 1 | 0.01 |
| | | adv,b,c,code1,code2,id,p | 100 | 50 | 0.5 | 100 | 50 | 0.5 |
| URL PASS | | /MSS1.rar | 20 | 20 | 0.2 | 0 | 0 | 0 |
| | | /disclosures/offers/disclosure.iq.driverfighter_r1_v2.zip | 10 | 10 | 0.1 | 10 | 10 | 0.1 |
| | | /newbos2.exe | 160 | 80 | 0.8 | 160 | 80 | 0.8 |
| DESTINA-TION PORT (TCP) | | 8080 | 100 | 1 | 0.01 | 100 | 1 | 0.01 |
| | | 1111 | 100 | 50 | 0.5 | 30 | 10 | 0.1 |
| DESTINA-TION PORT (UDP) | | 23456 | 140 | 70 | 0.7 | 100 | 1 | 0.01 |
| | | 54633 | 100 | 50 | 0.5 | 20 | 15 | 0.15 |

BLACK LIST GENERATING DEVICE, BLACK LIST GENERATING SYSTEM, METHOD OF GENERATING BLACK LIST, AND PROGRAM OF GENERATING BLACK LIST

FIELD

The present invention relates to a black list generating device, a black list generating system, a method of generating a black list, and a program of generating a black list.

BACKGROUND

Attacks carried out through the Internet is becoming increasingly complex, and defense at the entrance cannot be completely effective against infection of a computer terminal to malware. Post-measures for discovering infection as quick as possible after a successful attack are therefore becoming more important in preventing widespread damage.

Generation of a blacklist is a known technique. As a method of generating a black list, such a technique is known that accesses to a suspicious URL, which is suspected to be malicious to an extent, determines whether the URL is actually malicious based on its subsequent behavior in communication, and adds the URL to the blacklist.

Use of a system including a honeypot as illustrated in FIG. 12 is another known method. FIG. 12 is a drawing that illustrates a conventional blacklist generating system. The blacklist generating system illustrated in FIG. 12 generates a blacklist of malicious URLs on the basis of information acquired using the honeypot technique and extends the blacklist by warning of URLs looking similar to the acquired malicious URL and by attempting to collect information (for example, see Patent Literature 1).

CITATION LIST

Patent Literature

Patent Literature 1: Japanese Laid-open Patent Publication No. 2012-118713

SUMMARY

Technical Problem

Such a conventional method that actually accesses a suspicious URL allows creation of a highly accurate blacklist; however, the method has a problem in efficiently generating a blacklist because the types of recognizable malicious URL are limited. Furthermore, modern malware executes various types of communication, and the method that simply determines all destinations of communication of the malware to be malicious URLs and uses a blacklist including the malicious URL and URLs looking similar to the URL may thus problematically cause false detection and have difficulty in expanding coverage of detectable malware.

To overcome the above-described problems, the present invention aims to efficiently generate a blacklist causing less false detection and having extensive coverage of malware.

Solution to Problem

To solve a problem and to achieve an object, a blacklist generating device includes: a log acquiring function for acquiring a first communication log obtained through malware communication and a second communication log obtained through certain network communication; a first extracting function for calculating a first statistic on the frequency of appearance of each communication pattern having a set of a field and a value included in the first communication log, extracting a communication pattern having the first statistic satisfying a certain condition, and outputting the communication pattern to a potential blacklist; a second extracting function for calculating a second statistic on the frequency of appearance of each communication pattern included in the second communication log, extracting a communication pattern having the second statistic satisfying a certain condition, and outputting the communication pattern to a whitelist; and a blacklist creating function for searching the potential blacklist for a value with a value of a corresponding field on the whitelist, excluding a coincident communication pattern from the potential blacklist, and creating a blacklist.

A blacklist generating system includes: a first log collection and storage device that collects a communication log from malware communication and stores therein the communication log as a first communication log; a second log collection and storage device that collects a communication log from certain network communication and stores therein the communication log as a second communication log; and a blacklist generating device, wherein the blacklist generating device includes: a log acquiring function for acquiring the first communication log stored in the first log collection and storage device and the second communication log stored in the second log collection and storage device; a first extracting function for calculating a first statistic on the frequency of appearance of each communication pattern having a set of a field and a value included in the first communication log, extracting a communication pattern having the first statistic satisfying a certain condition, and outputting the communication pattern to a potential blacklist; a second extracting function for calculating a second statistic on the frequency of appearance of each communication pattern included in the second communication log, extracting a communication pattern having the second statistic satisfying a certain condition, and outputting the communication pattern to a whitelist; and a blacklist creating function for searching the potential blacklist for a value with a value of a corresponding field on the whitelist, excluding a coincident communication pattern from the potential blacklist, and creating a blacklist.

A method of generating a blacklist, the method includes: a first log collection and storage step of collecting a communication log from malware communication and storing the communication log as a first communication log; a second log collection and storage step of collecting a communication log from certain network communication and storing the communication log as a second communication log; a log acquiring step of acquiring the first communication log stored at the first log collection and storage step and the second communication log stored at the second log collection and storage step; a first extracting step of calculating a first statistic on the frequency of appearance of each communication pattern having a set of a field and a value included in the first communication log, extracting a communication pattern having the first statistic satisfying a certain condition, and outputting the communication pattern to a potential blacklist; a second extracting step of calculating a second statistic on the frequency of appearance of each communication pattern included in the second communication log, extracting a communication pattern having the second statistic satisfying a certain condition, and outputting the communication pattern to a whitelist; and a blacklist generating step of searching the potential blacklist for a value with a value of a corresponding field on the whitelist, excluding a coincident communication pattern from the potential blacklist, and creating a blacklist.

A blacklist generating program that causes a computer to execute: a log acquiring step of acquiring a first communication log obtained through malware communication and a second communication log obtained through certain network communication; a first extracting step of calculating a first statistic on the frequency of appearance of each communication pattern having a set of a field and a value included in the first communication log, extracting a communication pattern having the first statistic satisfying a certain condition, and outputting the communication pattern to a potential blacklist; a second extracting step of calculating a second statistic on the frequency of appearance of each communication pattern included in the second communication log, extracting a communication pattern having the second statistic satisfying a certain condition, and outputting the communication pattern to a whitelist; and a blacklist generating step of searching the potential blacklist for a value with a value of a corresponding field on the whitelist, excluding a coincident communication pattern from the potential blacklist, and creating a blacklist.

Advantageous Effects of Invention

According to the present invention, a blacklist causing less false detection and having extensive coverage of malware can be efficiently generated.

BRIEF DESCRIPTION OF DRAWINGS

FIG. 2 is a drawing that illustrates exemplary fields of a communication log in a blacklist generating device according to the first embodiment.

FIG. 3 is a drawing that illustrates exemplary profile information of a malicious communication log in the blacklist generating device according to the first embodiment.

FIG. 4 is a drawing that illustrates exemplary potential blacklists in the blacklist generating device according to the first embodiment.

FIG. 5 is a drawing that illustrates exemplary profile information of a normal communication log in the blacklist generating device according to the first embodiment.

FIG. 6 is a drawing that illustrates exemplary whitelists in the blacklist generating device according to the first embodiment.

FIG. 7 is a drawing that illustrates exemplary blacklists in the blacklist generating device according to the first embodiment.

FIG. 8 is another drawing that illustrates exemplary blacklists in the blacklist generating device according to the first embodiment.

FIG. 9 is a drawing that illustrates exemplary profile information in the blacklist generating device according to the first embodiment.

DESCRIPTION OF EMBODIMENTS

Configuration of a Blacklist Generating System According to a First Embodiment

Figure 1:
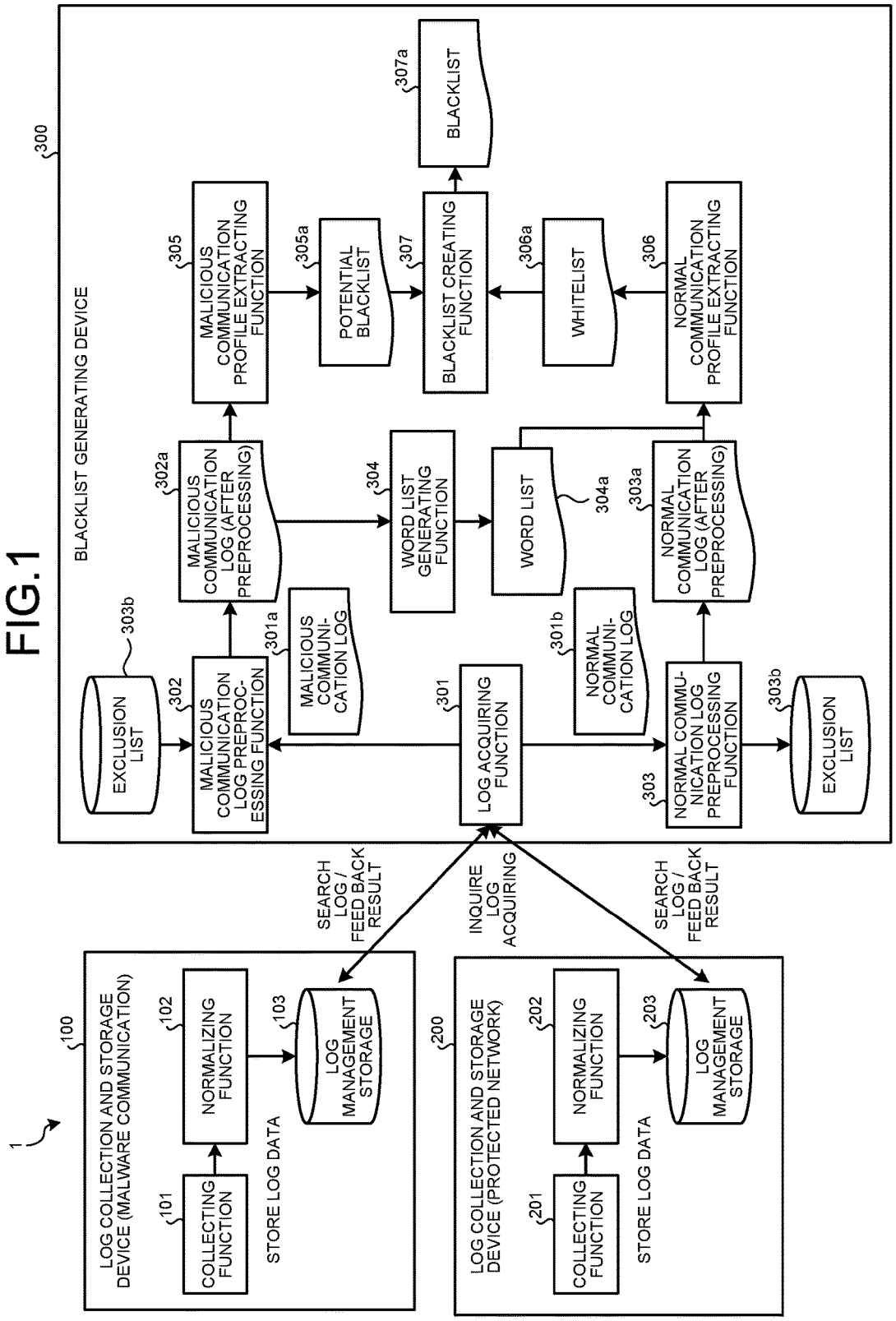
FIG. 1 is a drawing that illustrates an exemplary configuration of a blacklist generating system according to a first embodiment.

A configuration of a first embodiment in the present invention will now be described with reference to the drawings. A configuration of a blacklist generating system 1 of the embodiment will be described with reference to FIG. 1. FIG. 1 is a drawing that illustrates an exemplary configuration of the blacklist generating system according to the first embodiment. It should be noted that the present invention is not limited to this embodiment.

The blacklist generating system 1 includes log collection and storage devices 100 and 200 and a blacklist generating device 300. The log collection and storage device 100 collects and stores therein communication logs of malware. The log collection and storage device 200 collects and stores therein communication logs in a protected network. In this embodiment, respective different devices collect and store communication logs of malware and communication logs in a protected network; however, a single device may collect and store communication logs of malware and a protected network.

In the following description, a communication log of malware will be referred to as a "malicious communication log", whereas a communication log in a protected network will be referred to as a "normal communication log". A communication log of malware is output when the malware is executed in a sandboxed communication environment for the malware.

The log collection and storage devices 100 and 200 collect logs of, for example, a firewall, a web proxy, and a DNS server as communication logs. The log collection and storage devices 100 and 200 may further collect logs of a security appliance monitoring communication of, for example, an Intrusion Detection System (IDS) and Intrusion Prevention System (IPS).

As illustrated in FIG. 1, the log collection and storage device 100 includes a collecting function 101, a normalizing function 102, and a log management storage 103. The collecting function 101 collects a communication log from a collection target such as the above-described devices and systems in a communication environment for malware. The normalizing function 102 normalizes the collected communication log on the basis of the fields illustrated in FIG. 2. FIG. 2 is a drawing that illustrates exemplary fields of a communication log in a blacklist generating device according to the first embodiment. The normalized communication log is stored in the log management storage 103.

As illustrated in FIG. 1, the log collection and storage device 200 has the same configuration as that of the log collection and storage device 100. The log collection and storage device 200 includes a collecting function 201, a normalizing function 202, and a log management storage 203. The collecting function 201 collects a communication log from a collection target such as the above-described devices and systems in a protected network. The normalizing function 202 normalizes the collected communication log on the basis of the fields illustrated in FIG. 2. The normalized communication log is stored in the log management storage 203.

The fields illustrated in FIG. 2 are merely examples, and fields of a communication log collected and normalized by the log collection and storage devices 100 and 200 are not limited to the fields of FIG. 2. The log collection and storage devices 100 and 200 do not necessarily acquire a value for each field illustrated in FIG. 2 and may acquire values in selected fields.

As illustrated in FIG. 1, the blacklist generating device 300 includes a log acquiring function 301, a malicious communication log preprocessing function 302, a normal communication log preprocessing function 303, a word list generating function 304, a malicious communication profile extracting function 305, a normal communication profile extracting function 306, and a blacklist creating function 307.

The log acquiring function 301 acquires a malicious communication log 301a obtained through communication by malware and a normal communication log 301b obtained through communication in a protected network as a certain network.

The malicious communication profile extracting function 305 serving as a first extracting function calculates statistics on the frequency of appearance of each communication pattern having a set of a field and a value included in a malicious communication log 302a, extracts a communication pattern in which the statistics satisfy a certain condition, and outputs the communication pattern to a potential blacklist 305a. The malicious communication profile extracting function 305 may further arrange the malicious communication log 302a in the descending order of the statistics and output communication patterns listed higher than a certain rank to the potential blacklist 305a.

The normal communication profile extracting function 306 serving as a second extracting function calculates statistics on the frequency of appearance of each communication pattern included in a normal communication log 303a, extracts a communication pattern in which the statistics satisfy a certain condition, and outputs the communication pattern to a whitelist 306a. The normal communication profile extracting function 306 may further arrange the normal communication log 303a in the descending order of the statistics and output communication patterns listed higher than a certain rank to the whitelist 306a.

The blacklist creating function 307 searches the potential blacklist 305a for a value with the value on a corresponding field in the whitelist 306a, excludes a coincident communication pattern from the potential blacklist 305a, and outputs the remaining communication pattern to a blacklist 307a. The blacklist creating function 307 may output a value to the blacklist 307a in a regular expression.

The normal communication log preprocessing function 303 extracts a communication destination accessed more than a certain number of times in a certain network from the normal communication log 301b. The malicious communication log preprocessing function 302 excludes a communication log corresponding to the extracted communication destination from the malicious communication log 301a.

The word list generating function 304 extracts a character string frequently appearing on the malicious communication log 302a more than a certain number of times and generates a word list 304a. The normal communication profile extracting function 306 turns a part other than parts coinciding with the character strings included in the word list 304a in a value on the whitelist 306a into a regular expression.

Although the malicious communication log preprocessing function 302, the normal communication log preprocessing function 303, and the word list generating function 304 of the above-described functions do not always have to be included in the configuration, these functions exert advantageous effects in improving accuracy of the blacklist 307a generated by the blacklist generating device 300. Processing performed by each function will now be described in detail.

The log acquiring function 301 inquires a communication log of each of the log collection and storage devices 100 and 200. The log acquiring function 301 can request the log collection and storage devices 100 and 200 to search for communication logs by, for example, a field or a value of the field for a certain period and give feedback of the search result. Upon inquiry from the log acquiring function 301, each of the log collection and storage devices 100 and 200 searches for a communication log and gives feedback of the search result to the log acquiring function 301.

When the log acquiring function 301 acquires the communication logs from the log collection and storage devices 100 and 200, the log acquiring function 301 forwards the malicious communication log 301a to the malicious communication log preprocessing function 302 and forwards the normal communication log 301b to the normal communication log preprocessing function 303.

The normal communication log preprocessing function 303 determines a domain accessed by terminals the number of which is equal to or more than a certain threshold of targeted terminals for the normal communication log 301b to be a popular communication destination in the protected network. The normal communication log preprocessing function 303 makes a list of popular communication destinations and outputs the list as an exclusion list 303b. The exclusion list 303b is sent to the malicious communication log preprocessing function 302, and the normal communication log 303a is forwarded to the normal communication profile extracting function 306. The exclusion list 303b may be created on the basis of a fully qualified domain name (FQDN) other than the above-described domain. Domains used by major web search engines such as YAHOO! (registered trademark) and Google (registered trademark) having a large number of visitors are examples of the popular communication destination.

The malicious communication log preprocessing function 302 receives the malicious communication log 301a from the log acquiring function 301 and receives the exclusion list 303b from the normal communication log preprocessing function 303. The malicious communication log preprocessing function 302 filters the malicious communication log 301a on the basis of the exclusion list 303b. The malicious communication log preprocessing function 302 excludes a communication log the communication destination of which is included in the exclusion list 303b from the malicious communication log 301a and outputs the malicious communication log 301a as a malicious communication log 302a. The malicious communication log preprocessing function 302 forwards the malicious communication log 302a to the word list generating function 304 and the malicious communication profile extracting function 305. In this process, the malicious communication log preprocessing function 302 may exclude a communication log the communication destination of which is a domain wellknown as a promotional website or a frequently accessed domain in the society in addition to the communication log having a communication destination included in the exclusion list 303b.

The word list generating function 304 receives the malicious communication log 302a from the malicious communication log preprocessing function 302. The word list generating function 304 thereafter extracts a character string satisfying a certain condition from the malicious communication log 302a and generates the word list 304a. Examples of the certain condition may include the condition that the length or the number of times of appearance of a character string exceeds a certain standard and the condition where those conditions are combined. The word list 304a is forwarded to the normal communication profile extracting function 306.

The malicious communication profile extracting function 305 receives the malicious communication log 302a from the malicious communication log preprocessing function 302. The malicious communication profile extracting function 305 thereafter extracts, for example, the number of occurrences, the number of malware pieces, and the occurrence rate of each value as profile information as illustrated in FIG. 3 for each field as illustrated in FIG. 2 from the malicious communication log 302a. FIG. 3 is a drawing that illustrates exemplary profile information of a malicious communication log in the blacklist generating device according to the first embodiment.

The malicious communication profile extracting function 305 makes a list of the extracted information as illustrated in FIG. 4 and determines the information to be the potential blacklist 305a in each field. FIG. 4 is a drawing that illustrates exemplary potential blacklists in the blacklist generating device according to the first embodiment. The malicious communication profile extracting function 305 may arrange the values in each field in rankings and add values listed higher than a certain rank to the potential blacklist 305a.

For example, in the example of FIG. 3, the communication patterns on the malicious communication log 302a are arranged in the descending order of the number of occurrences, and three communication patterns having the largest numbers of occurrences in the malicious communication log 302a are output to the potential blacklist 305a. In this case, if two communication patterns having the largest numbers of occurrences are output to the potential blacklist 305a, the communication pattern having the value of "10.0.0.3" in the "destination IP address" field is not included in the potential blacklist 305a.

The number of occurrences represents the number of appearances of the value in the malicious communication log 302a. The number of malware pieces represents the number of malware samples causing the value to occur. The occurrence rate is the proportion of the number of malware pieces to the total number of malware pieces included in the malicious communication log 302a. In other words: the number of occurrences=the number of appearances of the communication pattern (including duplication of malware); the number of malware pieces=the number of malware pieces causing the communication pattern to occur (excluding duplication of malware); and the occurrence rate=the number of malware pieces causing the communication pattern to occur (excluding duplication of malware)/the total number of malware samples included in the malicious communication log 302a.

In the example of FIG. 3, the number of malware pieces excluding duplication of malware is 100. In this case, for example, a communication pattern having "192.168.10.30" in the "destination IP address" is included in 80 malware pieces, and the resulting occurrence rate is calculated as 80/100=0.8 as illustrated in FIG. 3.

The normal communication profile extracting function 306 receives the normal communication log 303a from the normal communication log preprocessing function 303 and receives the word list 304a from the word list generating function 304. The malicious communication profile extracting function 305 extracts profile information about the malware, whereas the normal communication profile extracting function 306 extracts profile information about the terminal. The normal communication profile extracting function 306 extracts, for example, the number of occurrences, the number of terminals, and the occurrence rate on each value from the normal communication log 303a as profile information as illustrated in FIG. 5 for each field as illustrated in FIG. 2. FIG. 5 is a drawing that illustrates exemplary profile information of a normal communication log in the blacklist generating device according to the first embodiment.

The number of occurrences represents the number of appearances of the value in the normal communication log 303a. The number of terminals represents the number of terminals causing the value to occur. The occurrence rate is the proportion of the number of terminals to the total number of terminals included in the normal communication log 303a. In other words: the number of occurrences=the number of appearances of the communication pattern (including duplication of malware); the number of terminals=the number of terminals causing the communication pattern to occur (excluding duplication of malware); and the occurrence rate=the number of terminals causing the communication pattern to occur (excluding duplication of malware)/the total number of terminals included in the normal communication log 303a.

In the example of FIG. 5, the number of terminals excluding duplication of malware is 100. In this case, for example, a communication pattern having "10.0.0.3" in the "destination IP address" is included in 40 terminals, and the resulting occurrence rate is calculated as 40/100=0.4 as illustrated in FIG. 5.

The normal communication profile extracting function 306 makes a list of extracted information as illustrated in FIG. 6 and determines the listed information to be the whitelist 306a in each field. FIG. 6 is a drawing that illustrates exemplary whitelists in the blacklist generating device according to the first embodiment. In extracting the whitelist 306a, for eliminating the possibility of causing false detection, the normal communication profile extracting function 306 sets such a condition that an item having the occurrence rate equal to or larger than 0.2 of the profile information illustrated in FIG. 5 is extracted to the whitelist 306a. The normal communication profile extracting function 306 may set conditions for each field. For example, such a condition may be set that the query key is not included in the whitelist 306a.

A case will now be described in which the normal communication profile extracting function 306 creates the whitelist 306a only if the occurrence rate is equal to or greater than 0.2 or equal to or greater than 0.6 for the "query key" field. In the example of FIG. 5, a communication pattern having the value of "10.0.0.3" in the "destination IP address" field has the occurrence rate greater than 0.2. In this case, the field is not the "query key", and the communication pattern therefore satisfies the condition and is included in the whitelist 306a. A communication pattern having the value of "adv,b,c,code1,code2,id,p" in the "query key" field has an occurrence rate of 0.5. In this case, because the field is "query key", the communication pattern does not satisfy the condition that the occurrence rate is equal to or greater than 0.6 and is therefore not included in the whitelist 306a.

As is the case with the malicious communication profile extracting function 305, the normal communication profile extracting function 306 may arrange the values in each field in rankings and add values listed higher than a certain rank to the whitelist 306a.

In the example of FIG. 5, the communication patterns on the normal communication log 303a are arranged in the descending order of the number of occurrences, and two communication patterns having the largest numbers of occurrences in the normal communication log 303a are output to the whitelist 306a. In this case, for example, a communication pattern having the value of "192.168.10.30" in the "destination IP address" field is included in the whitelist 306a.

In the case of outputting a value to the whitelist 306a in a regular expression, a different value matching the regular expression is regarded as an identical communication pattern, and the number of occurrences of the different value is accordingly counted. In outputting a value to the whitelist 306a without turning the value into a regular expression, the number of occurrences of a different value is counted as a different communication pattern. Even with the same value, a value in a regular expression is likely to be put in a higher rank in the above-described rankings compared with the value not in a regular expression.

From this viewpoint, a value represented in a character string included in the word list 304a may be output to the whitelist 306a without being turned into a regular expression. With this arrangement, the value represented in a character string included in the word list 304a is less likely to be put in a higher rank in the above-described rankings. Consequently, this method can prevent a value that accurately captures the characteristics of malware communication and is appropriate to be included in the blacklist 307a is prevented from being excluded from the blacklist 307a because of use of the whitelist 306a.

The blacklist creating function 307 receives the potential blacklist 305a from the malicious communication profile extracting function 305 and receives the whitelist 306a from the normal communication profile extracting function 306. The blacklist creating function 307 thereafter excludes a value listed on the whitelist 306a from the potential blacklist 305a and creates the blacklist 307a.

For example, the value "10.0.0.3" is included in the "destination IP" field of the whitelist 306a illustrated in FIG. 6. If the "destination IP" field of the potential blacklist 305a in FIG. 4 is searched for the value "10.0.0.3", the coincident value "10.0.0.3" is found in the field, and the communication pattern having "10.0.0.3" in the destination IP is thus excluded. The same processing is performed on the fields of "UserAgent", "URL", and "URL pass".

The blacklist creating function 307 creates the blacklists 307a illustrated in FIGS. 7 and 8. FIG. 7 and FIG. 8 are drawings that illustrate exemplary blacklists in the blacklist generating device according to the first embodiment. FIG. 7 illustrates the blacklist 307a created in real values, whereas FIG. 8 illustrates the blacklist 307a created in patterns in regular expressions.

In the above-described process, the blacklist 307a is created by outputting the potential blacklist 305a and the whitelist 306a and matching the lists to each other; however, the method of creating the blacklist 307a is not limited thereto. For example, as illustrated in FIG. 9, the blacklist 307a may be created by directly matching profile information of malicious communication and profile information of normal communication to each other for comparison and excluding a value that has to be excluded from the potential blacklist 305a.

More specifically, if the condition to be included in the whitelist 306a is the occurrence rate being equal to or greater than 0.2 or equal to or greater than 0.6 for the "query key" field, then a communication pattern having the value of "10.0.0.3" in the "destination IP address" field is included in the whitelist 306a. The communication pattern is thus excluded from the potential blacklist 305a and not included in the blacklist 307a. A communication pattern having the value of "adv,b,c,code1,code2,id,p" in the "query key" field has an occurrence rate of 0.5. In this case, because the field is "query key", the communication pattern does not satisfy the condition of the occurrence rate being equal to or greater than 0.6 and is therefore not included in the whitelist 306a. The communication pattern is not excluded from the potential blacklist 305a and accordingly included in the blacklist 307a.

Processing of a Blacklist Generating System According to the First Embodiment

Figure 10:
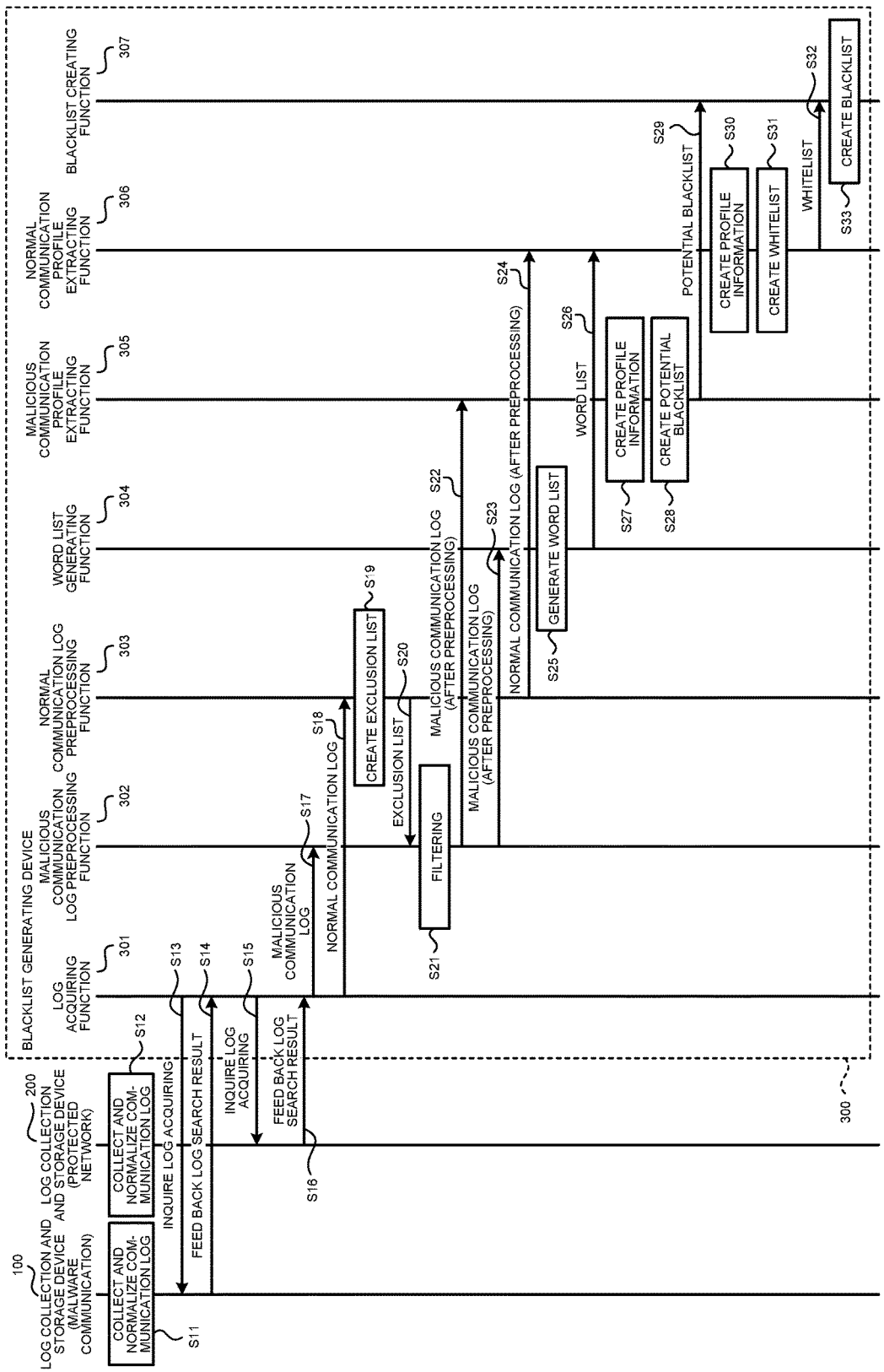
FIG. 10 is a drawing that illustrates exemplary processing in the blacklist generating system according to the first embodiment.

Processing of the first embodiment in the present invention will now be described with reference to FIG. 10. FIG. 10 is a drawing that illustrates exemplary processing in the blacklist generating system according to the first embodiment.

As illustrated in FIG. 10, the log collection and storage device 100 preliminarily collects and normalizes a communication log and stores the communication log (Step S11). Likewise, the log collection and storage device 200 preliminarily collects and normalizes a communication log and stores the communication log (Step S12).

The log acquiring function 301 inquires a log of the log collection and storage device 100 (Step S13). The log collection and storage device 100 searches the stored communication logs and gives feedback of the search result to the log acquiring function 301 (Step S14). The log acquiring function 301 further inquires a log of the log collection and storage device 200 (Step S15). The log collection and storage device 200 searches the stored communication logs and gives feedback of the search result to the log acquiring function 301 (Step S16).

The log acquiring function 301 forwards the communication log received from the log collection and storage device 100 to the malicious communication log preprocessing function 302 as a malicious communication log (Step S17). The log acquiring function 301 forwards the communication log received from the log collection and storage device 200 to the normal communication log preprocessing function 303 as a normal communication log (Step S18).

The normal communication log preprocessing function 303 creates an exclusion list on the basis of the normal communication log (Step S19) and forwards the created exclusion list to the malicious communication log preprocessing function 302 (Step S20).

The malicious communication log preprocessing function 302 filters the malicious communication log using the exclusion list received from the normal communication log preprocessing function 303 (Step S21). The malicious communication log preprocessing function 302 forwards the malicious communication log after the preprocessing of filtering to the malicious communication profile extracting function 305 (Step S22). The malicious communication log preprocessing function 302 further forwards the malicious communication log after the preprocessing of filtering to the word list generating function 304 (Step S23). The normal communication log preprocessing function 303 forwards the normal communication log after the preprocessing to the normal communication profile extracting function 306 (Step S24).

The word list generating function 304 thereafter generates a word list on the basis of the malicious communication log (Step S25) and forwards the generated word list to the normal communication profile extracting function 306 (Step S26).

The malicious communication profile extracting function 305 creates profile information on the malicious communication on the basis of the malicious communication log (Step S27) and creates a potential blacklist on the basis of the created profile information (Step S28). The malicious communication profile extracting function 305 thereafter forwards the created potential blacklist to the blacklist creating function 307 (Step S29).

The normal communication profile extracting function 306 creates profile information on the normal communication on the basis of the normal communication log (Step S30) and creates a whitelist on the basis of the created profile information and word list (Step S31). The normal communication profile extracting function 306 thereafter forwards the created whitelist to the blacklist creating function 307 (Step S32).

The blacklist creating function 307 creates a blacklist on the basis of the potential blacklist and the whitelist (Step S33).

Effects of First Embodiment

The blacklist generating device 300 according to this embodiment acquires the malicious communication log 301a obtained through malware communication and the normal communication log 301b obtained through communication in a protected network using the log acquiring function 301. The malicious communication profile extracting function 305 calculates statistics on the frequency of appearance of each communication pattern having a set of a field and a value included in the malicious communication log 301a and outputs a communication pattern in which the statistics satisfy a certain condition to the potential blacklist 305a. The normal communication profile extracting function 306 calculates statistics on the frequency of appearance of each communication pattern included in the normal communication log 301b and outputs a communication pattern in which the statistics satisfy a certain condition to the whitelist 306a. The blacklist creating function 307 searches the potential blacklist 305a for a value with the value listed on a corresponding field in the whitelist 306a, excludes a coincident communication pattern from the potential blacklist 305a, and creates the blacklist 307a.

A blacklist can be generated for each field as illustrated in FIG. 2 using data in which a malicious communication log obtained by the log collection and storage device 100 has been normalized. The generated blacklist, however, problematically increases the false detection rate. To overcome the disadvantage, in this embodiment, a blacklist is generated by generating a whitelist from a normal communication log and comparing the list with a potential blacklist.

With this method, a blacklist causing less false detection and having extensive coverage of malware can be efficiently generated. Malware detection using the blacklist 307a generated by the blacklist generating device 300 in the embodiment allows more accurate and earlier discovery of infection of the terminal and unauthorized communication.

In the blacklist generating device 300 in this embodiment, the malicious communication profile extracting function 305 arranges the malicious communication log 302a in the descending order of the statistics and outputs communication patterns listed higher than a certain rank to the potential blacklist 305a. With this arrangement, communication patterns increasing the false detection rate can be excluded from the processing. The normal communication profile extracting function 306 arranges the normal communication log 303a in the descending order of the statistics and outputs communication patterns listed higher than a certain rank to the whitelists 306a. With this arrangement, communication patterns decreasing the detection rate can be excluded from the processing.

In the blacklist generating device 300 of this embodiment, the normal communication log preprocessing function 303 extracts a communication destination accessed by terminals the number of which is equal to or more than a certain threshold in the protected network from the normal communication log 301b and outputs the destination to the exclusion list 303b. The malicious communication log preprocessing function 302 excludes a communication log corresponding to the communication destination included in the exclusion list 303b from the malicious communication log 301a. This process can decrease the rate of false detection in which a normal communication log is detected as a malicious communication log and accordingly allows more efficient blacklist generating processing.

In the blacklist generating device 300 of this embodiment, the word list generating function 304 extracts a character string frequently appearing on the malicious communication log 302a more than a certain number of times and outputs the character string to the word list 304a. The normal communication profile extracting function 306 turns a part other than parts coinciding with the character strings included in the word list 304a in a value on the whitelist 306a into a regular expression. This process enables the blacklist creating function 307 to make a wide-coverage search using the whitelist 306a.

Furthermore, searching using the whitelist 306a can be more limited by not turning a character string included in the word list 304a in a regular expression. This method can reduce the likelihood that the blacklist creating function 307 fails to exclude an actually malicious communication pattern by regarding the communication pattern as a pattern included in the whitelist 306a.

Program

A program where processing executed by the blacklist generating device 300 of the above-described embodiment is written in a computer-executable language can be created and executed. In this case, the same advantageous effects as those in the above-described embodiment can be obtained by causing the computer to execute the program. Moreover, the same processing as the embodiment can be implemented by recording the program in a computer-readable memory medium and causing the computer to read and execute the program recorded in the memory medium. An exemplary computer executing a control program implementing the same functions as those of the blacklist generating device 300 will now be described.

Figure 11:
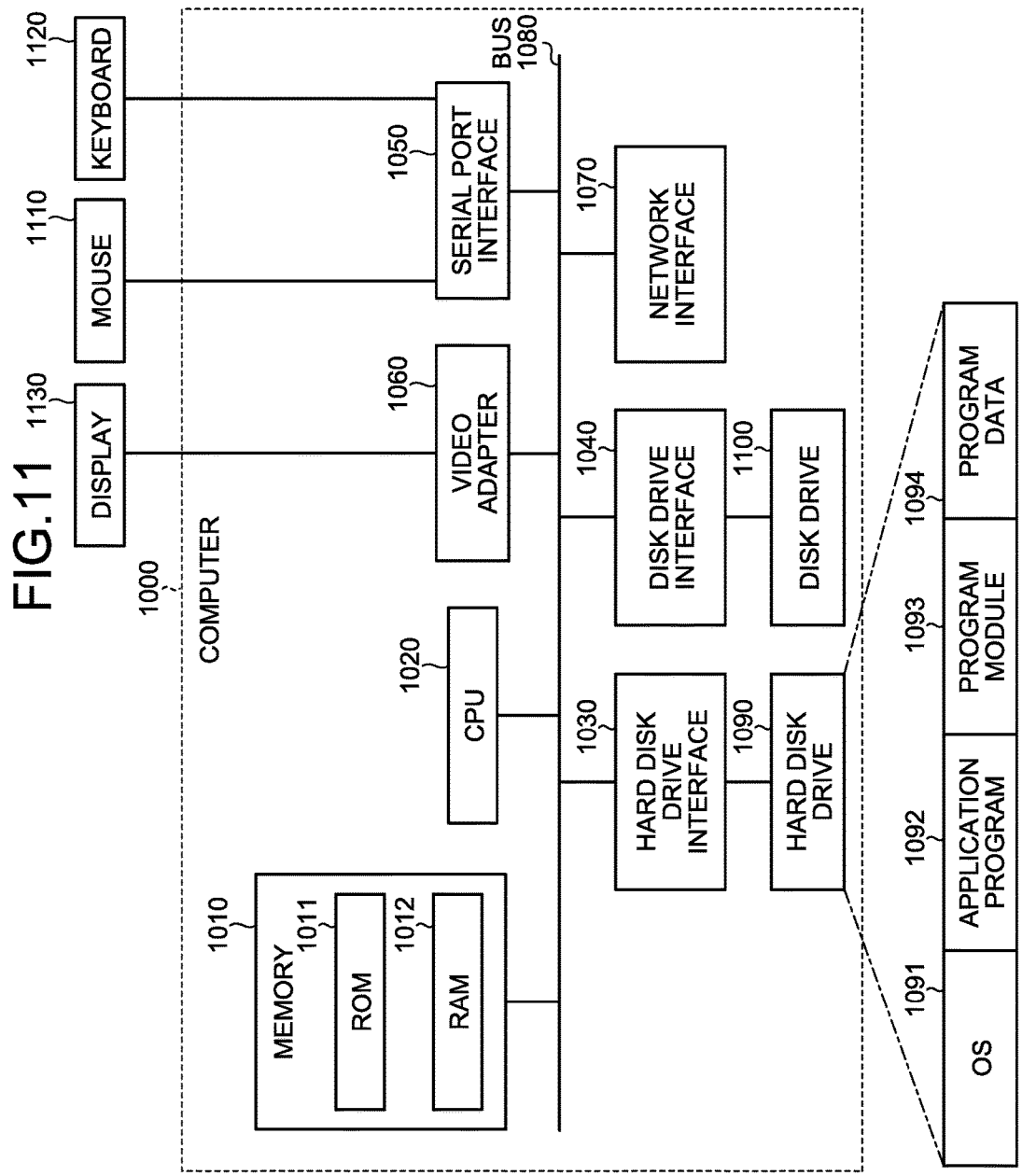
FIG. 11 is a drawing that illustrates an exemplary computer executing a blacklist generating program.
Figure 12:
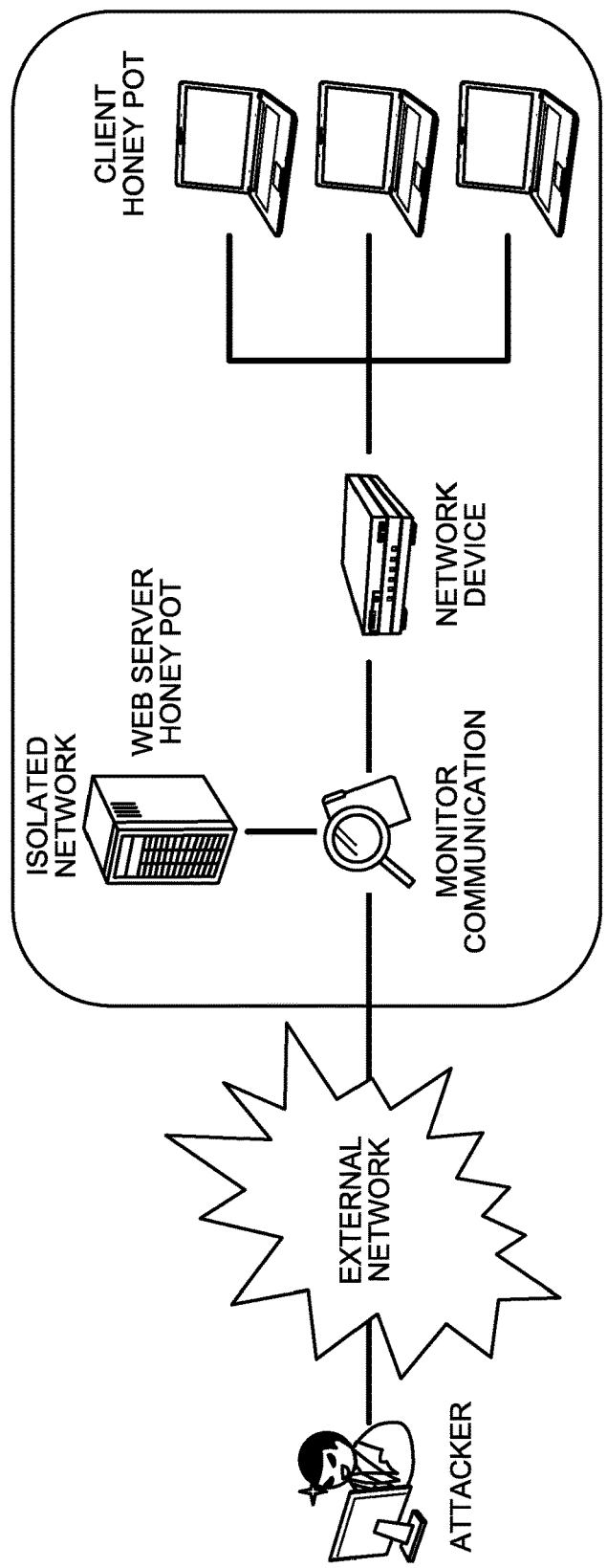
FIG. 12 is a drawing that illustrates a conventional blacklist generating system.

FIG. 11 is a drawing that illustrates an exemplary computer executing a blacklist generating program. As illustrated in FIG. 11, a computer 1000 includes a memory 1010, a central processing unit (CPU) 1020, a hard disk drive interface 1030, a disk drive interface 1040, a serial port interface 1050, a video adapter 1060, a network interface 1070, and others. These units are connected with one another by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. The disk drive 1100 has a detachable/attachable recording medium such as a magnetic disk and an optical disk inserted thereinto. The serial port interface 1050 has, for example, a mouse 1110 and a keyboard 1120 connected thereto. The video adapter 1060 has, for example, a display 1130 connected thereto.

As illustrated in FIG. 11, the hard disk drive 1090 stores therein an OS 1091, an application program 1092, a program module 1093, program data 1094, and others. The information described in the above-described embodiment is stored, for example, in the hard disk drive 1090 and the memory 1010.

A blacklist generating program is stored, for example, in the hard disk drive 1090 as a program module where commands executed by the computer 1000 are written. More specifically, a program module where each processing executed by the blacklist generating device 300 is written is stored in the hard disk drive 1090.

Data used for information processing executed by the blacklist generating program is stored, for example, in the hard disk drive 1090 as program data. The CPU 1020 reads the program module 1093 and the program data 1094 stored in the hard disk drive 1090 on the RAM 1012 as necessary and executes the above-described procedures.

The program module 1093 and the program data 1094 relating to the blacklist generating program are not always stored in the hard disk drive 1090 and, for example, may be stored on a detachable/attachable memory medium and read out by the CPU 1020 through the disk drive 1100 and the like. The program module 1093 and the program data 1094 relating to the control program may be stored in another computer connected through a network such as the local area network (LAN) and a wide area network (WAN) and read out by the CPU 1020 through the network interface 1070. Data may be collected by collecting packets in real time through the network interface 1070 and the like.

REFERENCE SIGNS LIST

1 blacklist generating system
100, 200 log collection and storage device
101, 201 collecting function
102, 202 normalizing function
103, 203 log management storage
300 blacklist generating device
301 log acquiring function
301a, 302a malicious communication log
301b, 303a normal communication log
302 malicious communication log preprocessing function
303 normal communication log preprocessing function
303b exclusion list
304 word list generating function
304a word list
305 malicious communication profile extracting function
305a potential blacklist
306 normal communication profile extracting function
306a whitelist
307 blacklist creating function
307a blacklist

The invention claimed is:

1. A blacklist generating device comprising:
processing circuitry configured to
acquire a first communication log obtained through malware communication and a second communication log obtained through certain network communication;
calculate a first statistic on the frequency of appearance of each communication pattern having a set of a field and a value included in the first communication log, extract a communication pattern having the first statistic satisfying a certain condition, and outputting the communication pattern to a potential blacklist;
calculate a second statistic on the frequency of appearance of each communication pattern included in the second communication log, extract a communication pattern having the second statistic satisfying a certain condition, and output the communication pattern to a whitelist; and
search the potential blacklist for a value with a value of a corresponding field on the whitelist, exclude a coincident communication pattern from the potential blacklist, and create a blacklist,
wherein the processing circuitry
arranges the first communication log from a communication pattern having a highest first statistic in descending order and outputs a certain number of communication patterns having higher first statistics on the first communication log to the potential blacklist, and
arranges the second communication log from a communication pattern having a highest second statistic in descending order and outputs a certain number of communication patterns having higher second statistics on the second communication log to the whitelist.

2. The blacklist generating device according to claim 1, wherein the processing circuitry is configured to extract, from the second communication log, a communication destination accessed by terminals the number of which is equal to or more than a certain threshold in the certain network, and eliminate a communication log corresponding to the communication destination from the first communication log.

3. The blacklist generating device according to claim 1, the processing circuitry being configured to extract a character string frequently appearing on the first communication log more than a certain number of times and generating a word list, wherein
the processing circuitry turns, into a regular expression, a part of a value on the whitelist other than a part coinciding with a character string included in the word list.

4. The blacklist generating device according to claim 1, wherein the processing circuitry turns a value on the blacklist into a regular expression and outputs the value.

5. A blacklist generating system comprising:
a first log collection and storage device that collects a communication log from malware communication and stores therein the communication log as a first communication log;
a second log collection and storage device that collects a communication log from certain network communication and stores therein the communication log as a second communication log; and
a blacklist generating device, wherein
the blacklist generating device includes processing circuitry configured to:
acquire the first communication log stored in the first log collection and storage device and the second communication log stored in the second log collection and storage device;
calculate a first statistic on the frequency of appearance of each communication pattern having a set of a field and a value included in the first communication log, extract a communication pattern having the first statistic satisfying a certain condition, and output the communication pattern to a potential blacklist;
calculate a second statistic on the frequency of appearance of each communication pattern included in the second communication log, extract a communication pattern having the second statistic satisfying a certain condition, and output the communication pattern to a whitelist; and search the potential blacklist for a value with a value of a corresponding field on the whitelist, exclude a coincident communication pattern from the potential blacklist, and create a blacklist, wherein the processing circuitry
arranges the first communication log from a communication pattern having a highest first statistic in descending order and outputs a certain number of communication patterns having higher first statistics on the first communication log to the potential blacklist, and arranges the second communication log from a communication pattern having a highest second statistic in descending order and outputs a certain number of communication patterns having higher second statistics on the second communication log to the whitelist.

6. A method of generating a blacklist, the method comprising:

a first log collection and storage step of collecting a communication log from malware communication and storing the communication log as a first communication log;

a second log collection and storage step of collecting a communication log from certain network communication and storing the communication log as a second communication log;

a log acquiring step of acquiring the first communication log stored at the first log collection and storage step and the second communication log stored at the second log collection and storage step;

a first extracting step of calculating a first statistic on the frequency of appearance of each communication pattern having a set of a field and a value included in the first communication log, extracting a communication pattern having the first statistic satisfying a certain condition, and outputting the communication pattern to a potential blacklist;

a second extracting step of calculating a second statistic on the frequency of appearance of each communication pattern included in the second communication log, extracting a communication pattern having the second statistic satisfying a certain condition, and outputting the communication pattern to a whitelist; and a blacklist generating step of searching the potential blacklist for a value with a value of a corresponding field on the whitelist, excluding a coincident communication pattern from the potential blacklist, and creating a blacklist, wherein the method further includes:
arranging the first communication log from a communication pattern having a highest first statistic in descending order and outputting a certain number of communication patterns having higher first statistics on the first communication log to the potential blacklist, and arranging the second communication log from a communication pattern having a highest second statistic in descending order and outputting a certain number of communication patterns having higher second statistics on the second communication log to the whitelist.

7. A non-transitory computer-readable recording medium having stored a blacklist generating program that causes a computer to execute:

a log acquiring step of acquiring a first communication log obtained through malware communication and a second communication log obtained through certain network communication;

a first extracting step of calculating a first statistic on the frequency of appearance of each communication pattern having a set of a field and a value included in the first communication log, extracting a communication pattern having the first statistic satisfying a certain condition, and outputting the communication pattern to a potential blacklist;

a second extracting step of calculating a second statistic on the frequency of appearance of each communication pattern included in the second communication log, extracting a communication pattern having the second statistic satisfying a certain condition, and outputting the communication pattern to a whitelist; and a blacklist generating step of searching the potential blacklist for a value with a value of a corresponding field on the whitelist, excluding a coincident communication pattern from the potential blacklist, and creating a blacklist, wherein the method further includes:
arranging the first communication log from a communication pattern having a highest first statistic in descending order and outputting a certain number of communication patterns having higher first statistics on the first communication log to the potential blacklist, and arranging the second communication log from a communication pattern having a highest second statistic in descending order and outputting a certain number of communication patterns having higher second statistics on the second communication log to the whitelist.

* * * * *